March 25, 1947.  G. W. DOWNS ET AL  2,417,974
DEMODULATOR CIRCUIT
Filed Sept. 28, 1942

(a) Amplified Bridge Output Voltage.

(b) Carrier Voltage across Half-section of Transformer Secondary 23.

(c) Voltage across Resistor 36.

(d) Voltage across Resistor 40.

(e) Voltage across Circuit 31-32.

(f) Final Output Voltage

GEORGE W. DOWNS,
DUNFORD A. KELLY,
INVENTORS.

BY
ATTORNEY

Patented Mar. 25, 1947

2,417,974

UNITED STATES PATENT OFFICE 2,417,974

DEMODULATOR CIRCUIT

George W. Downs, Pasadena, and Dunford A. Kelly, Los Angeles, Calif., assignors to William Miller Corporation, Pasadena, Calif., a corporation of California Application September 28, 1942, Serial No. 459,910

4 Claims. (Cl. 250—27)

This invention relates generally to systems for translating such changing or variable quantities as displacement, velocity, acceleration, strain, thickness, position, pressure, light intensity, and the like, into electrical current waves capable of being recorded or otherwise utilized for measurement or analysis purposes, and more particularly to translating systems of the carrier type for accomplishing such measurements or analyses.

The invention is typically applicable to the electrical analysis of vibration and of static and dynamic strain, and will be described herein with those applications chiefly in view, though without implied limitation thereto. By way of example, it is the practice to make extensive measurements and analyses of vibration and strain in aircraft, particularly in the course of test flights of new designs. Vibration pick-ups and strain gauges, designed to produce or control a voltage in accordance with displacement, velocity, acceleration, etc., are mounted on members of interest about the aircraft, and a recording oscillograph, connected to the pick-up or strain gauge through a suitable amplifier, is conventionally utilized to record the resulting voltage wave. Since many of the frequencies to be recorded are too low for convenient direct amplification, it has been the practice to so employ the vibration pick-up or strain gauge as to modulate a carrier wave. The modulated carrier wave is amplified, demodulated, the carrier filtered out, and the resulting wave recorded or otherwise utilized.

Modulation of a carrier wave by a vibration pick-up or strain gauge and subsequent demodulation, in such a way as to produce finally an amplified wave which furnishes a true representation of the displacement, velocity, acceleration, etc., of the member of interest, presents certain recognized problems. Assuming the case of a vibration pick-up as typical, it has been the conventional practice to impress a steady carrier frequency on an alternating current bridge, one or two arms of which comprise inductances which are a part of the vibration pick-up. The output of the bridge, which functions as a modulator, is amplified and rectified, and may then be passed through a low-pass filter, and finally recorded. The bridge has both reactive and resistive balance controls, which are alternately adjusted, with the pick-up at its stationary or dead center position, until zero or very slight carrier signal reaches the rectifier. If then, with the bridge in balance, the pick-up be allowed to vibrate, the variation in inductance of the pick-up coil or coils forming elements of the bridge throws the bridge out of balance alternately in one direction and then the other, allowing carrier current to flow during the times of displacement of the pick-up from its stationary or dead center position. It will be evident that the carrier current passed by the bridge will be bounded by positive and negative envelopes which touch the zero axis each time the pick-up passes through dead center. The vibratory movement is represented by alternate positive and negative loops of these two envelopes. That is to say, as the pick-up moves to one side of dead center and back, its movement is represented by a loop of the positive envelope, and as it then moves to the other side of dead center or back, its movement is represented by a loop of the negative envelope. Simple linear rectification of such a wave removes either the positive or negative half cycles of the carrier frequency, and yields a false wave of double frequency following the double frequency envelope of the remaining half cycles of the carrier frequency, as is well understood.

Accordingly, after balancing the bridge as aforesaid, it has been the practice to unbalance it with the resistive balance control until the expected vibration input will not quite send the bridge to the null or balance point, i. e., to the point where zero carrier output results, or in other words, to the point where the signal sense reverses from positive to negative. Under these conditions, the vibratory movement is completely represented by the positive envelope of the modulated wave, which at no time reaches the zero axis, and consequently demodulation results in a wave which is a true replica or representation of the original vibratory movement. This system is usable, though subject to some difficulty and inconvenience in that it necessitates first establishing both a resistive and a reactive balance, and then the necessary off-balance condition. In addition, since operation is possible with the bridge unbalanced to either side of the null point, the polarity of the signal may inadvertently be reversed, so that ambiguous readings are obtained. The system is also subject to the disadvantage that adjustment of gain disturbs the off-balance adjustment.

The object of the present invention is the provision of a simplified and improved demodulating circuit system for a carrier type measurement of the general character outlined, and particularly, one in which ambiguity of signal sense is impossible.

A further object is the provision of a system of the general character described, which is designed for operation at the balance point of the bridge.

A still further object is the provision of a novel rectifier system of improved design.

The invention will be best understood without further preliminary discussion by referring at once to a detailed description of one typical and preferred circuit for carrying the invention into effect. Reference for this purpose is had to the accompanying drawings, wherein.

Figure 2:
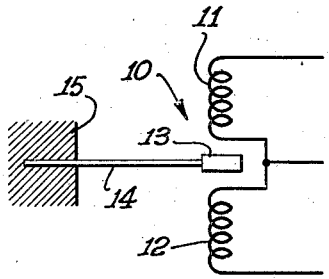
Fig. 2 is a diagram indicating conventionally one form of translating device, here indicated as a vibration pick-up.

Numeral 10 in Fig. 2 of the drawings designates generally a conventionally illustrated translating device, which in this case comprises a vibration pick-up having one or more impedances variable in accordance with the frequency and amplitude of the vibration to be measured. As here indicated, the pick-up has two impedances in the form of equal inductance coils 11 and 12, between which is a vibratory armature 13, conventionally indicated as carried by a flexible, resilient arm 14 having a fixed mounting at 15, it being understood that armature 13 and arm 14 will vibrate in accordance with the frequency and amplitude of any body on which the fixed mounting and coils of the pick-up are mounted. With the armature in its illustrated dead-center position, the inductances of the coils are equal, while vibratory movement of the armature alternately toward coils 11 and 12 causes the inductances or inductive reactances of the coils, and hence the amplitudes of the currents flowing through them, to be complementarily varied. As will be evident, the coils 11 and 12 are merely illustrative of suitable impedance elements, which in other suitable forms of pick-ups or translating devices may be variable resistances or condensers. And further, it is not essential to the invention, considered in its broader aspects, that two variable impedances be employed in the pick-up, it being possible to operate the system with but one variable impedance in the pick-up, and the other removed from the pick-up and so situated that its impedance remains fixed during operation. As before stated, the pick-up, per se, forms no part of the present invention, and is hence merely conventionally illustrated herein; and as a matter of fact, the translating device may be any current varying device such as a strain gauge, or the like, or even a photo-electric cell, or other type of current varying device as may be found applicable by those skilled in the art. The vibration pick-up here particularly instanced is thus to be taken as illustrative of merely one typical application of the invention.

Figure 1:
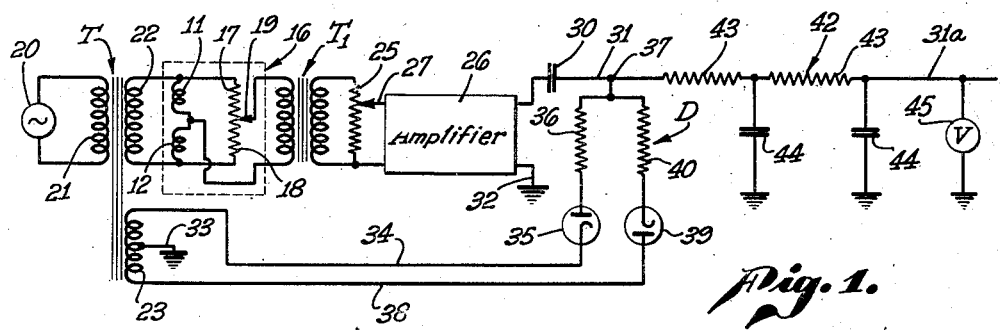
Fig. 1 is a diagram showing schematically one embodiment of the invention.

In the specific embodiments here chosen for illustrative purposes, the two impedances 11 and 12, shown typically as coils, are connected in series, and arranged as two adjacent arms of an alternating current bridge 16, as indicated in Fig. 1. Bridge 16 also has two adjacent resistive arms 17 and 18, made up typically of a one thousand ohm resistor connected across coils 11 and 12, and an adjustable tap 19 movable along said resistor and dividing it into the two resistive arms.

In order that the invention may be best understood, certain circuit constants are given as typical. It is to be understood, however, that these are merely illustrative, and to be regarded in no way as limitative on the invention, since wide departures are possible, particularly in modified forms of the invention.

Numeral 20 in Fig. 1 designates a source of carrier voltage, preferably a vacuum tube oscillator generating a steady frequency of the order of two thousand cycles, at a constant voltage of about fourteen volts. The output of oscillator 20 is connected across the primary winding 21 of transformer T having two secondary windings 22 and 23. Secondary winding 22 is connected across the two pairs of coils and resistances comprising bridge 16, as indicated.

The output current of the bridge is received by an output circuit having one input terminal connected to the bridge between the two coils 11 and 12, and another input terminal connected to adjustable tap 19, and therefore between the two resistance arms of the bridge. These input terminals, in the specific circuiting here illustrated, are connected across the primary of an amplifier input transformer $T_1$, which preferably has a step-up or turn ratio of about one to ten, and has its secondary connected across a gain control resistor 25, of a resistance preferably of the order of .5 megohm. One side of resistor 25 is connected directly to one input terminal of vacuum tube amplifier 26, while the adjustable gain control arm 27 is connected to the other input terminal of said amplifier. It should here be noted that while an amplifier will usually be required, owing to the relative weakness of the voltage wave appearing across the output connections of the bridge, it may not in all cases be essential. The amplifier, when used, should preferably have low amplitude distortion. Preferably, a negative feedback amplifier is employed.

The voltage output from amplifier 26 is impressed across the input terminals of a demodulator D, whose function is to produce a low frequency output as a result of the combination of the modulated carrier output from the amplifier with an unmodulated carrier wave. As here shown, one of said input terminals is coupled to the ungrounded side 31 of the demodulator circuit by means of condenser 30, while the other terminal is grounded by lead 32. The condenser 30 is of sufficient capacity to pass the carrier frequency, but not the low frequencies developed beyond it. A condenser 30 of .0005 mfd. serves the purpose.

The secondary winding or impedance 23 of transformer T has a center tap 33 to ground, being thus in effect connected to the grounded demodulator input terminal and each half-section of the winding has a number of turns such that a substantially stepped up voltage is produced. In a present illustrative embodiment, one hundred and fifty volts are developed across each half-section of the winding, as compared with fifty volts maximum output voltage from amplifier 26. One outside terminal of winding 23 is connected by a conductor 34, a diode rectifier tube 35, and a resistor 36, of the order of a .5 meg., to circuit lead 31 at a junction point 37 located beyond condenser 31 from amplifier 26, while the other outside terminal of transformer winding 23 is connected via conductor 38, diode rectifier tube 39, and resistor 40, also of a resistance of the order .5 meg., to circuit lead 31 at junction point 37. Diode 35 is arranged to conduct in the direction from transformer winding 23 towards circuit lead 31, while diode 39 is arranged oppositely, so as to conduct in the direction from circuit lead 31 toward transformer winding 23. Simplification results by the use of a single diode tube having two anodes and two cathodes within a single envelope, as will be evident to those skilled in the art, though the arrangement indicated is illustrative.

As indicated above, the 2000 cycle input to transformer T results in a 2000 cycle, 150 volt output voltage across each half-section of transformer secondary winding 23. When the upper end of winding 23 is negative and the lower end thereof is positive, the electron flow is in the direction from the winding through the diode circuit consisting of lead 34, rectifier tube 35, resistor 36, resistor 40, rectifier tube 39, and lead 38. When the polarity of winding 23 then reverses, rectifier tubes 35 and 39 become non-conducting, and the voltage across transformer secondary 23 produces no current in the diode circuit.

Beyond junction point 37, there is inserted in lead 31 a low pass resistance capacity filter 42 comprising series resistances 43, of the order of 1.0 meg. each, and shunt condensers 44 having capacities of the order of .00025 mfd.

The final output circuit lead 31a, beyond filter 42, carries the final current wave to be recorded or otherwise utilized for analysis or measurement purposes. No recording apparatus or other means for utilizing this current wave is indicated herein, since such apparatus may be conventional and may be employed in a conventional manner. A volt meter 45 is, however, diagrammatically indicated as connected across the circuit on the output side of the filter, being utilized in establishing the necessary balance of the bridge.

The complete operation of the system may now be described. The steady 2000 cycle carrier signal from oscillator 20 is impressed across bridge 16, and amplifier gain control 17 adjusted to normal amplifier output. Under such conditions, the demodulator circuit delivers a steady direct current output which passes filter 42, and the voltage of this output is noted at voltmeter 45. The bridge is then balanced by means of resistive balance control 19. Voltmeter 45 then gives a zero reading. No reactive balance control is essential if the inductances of coils 11 and 12 be made closely equal, and none is here indicated, though such a control may of course be provided, if desired. The resistive output component of the bridge being thus balanced, the equipment is in operating condition.

Figure 3:
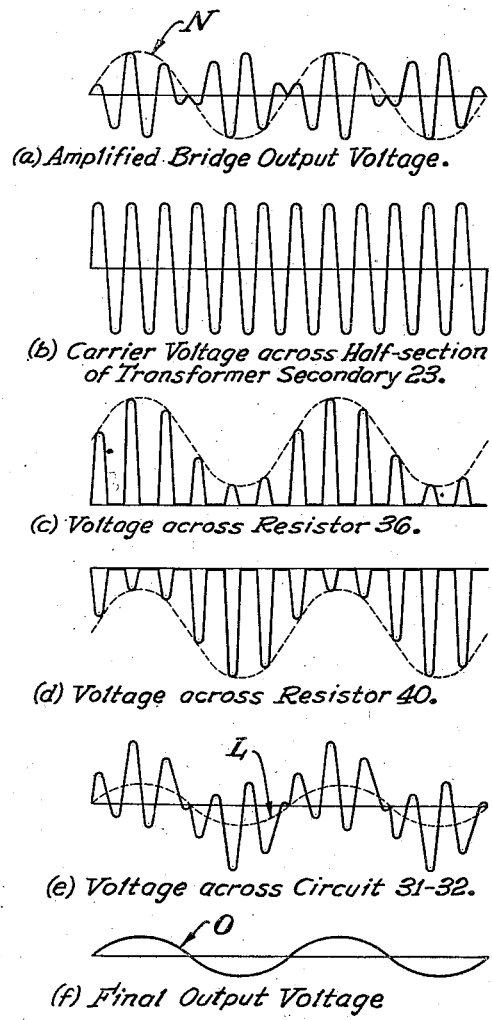
Fig. 3 shows certain voltage waves occurring in various parts of the system of Fig. 1.

Assuming the vibration pick-up to be mounted on a vibratory body which traces an unknown vibration wave, its armature vibrates between coils 11 and 12 in accordance with that wave, traveling alternately on opposite sides of its predetermined or given neutral or dead-center position, and causing the reactances of said coils, and therefore the currents flowing through them, to vary complementarily, one increasing and the other decreasing with excursions of the pick-up armature on one side of dead center, and vice versa. In other words, the bridge is alternately unbalanced in one direction or sense and then the other, following the amplitude and sense of the vibratory excursions of the armature of the vibration pick-up on the two sides of its dead-center position. The resulting voltage wave appearing across the output terminals of the bridge is amplified at 26, and the amplifier output voltage wave is of the form shown at $a$ in Fig. 3. The high frequency wave represents the carrier wave, and the sinusoidal wave outline N represents the assumed sinusoidal vibratory movement of the pick-up armature on both sides of dead center, represented by the zero axis, and therefore the amount and sense or direction of unbalance of the bridge. It is to be noted that the carrier voltage reverses direction or phase as the wave outline N crosses the zero axis, i. e. as the bridge passes from unbalance in one direction through the balance point to unbalance in the other. Thus displacements of the pick-up armature in opposite directions from dead center cause the carrier signal to be passed through the bridge, but with 180° phase displacement, so that successive half-cycles of the vibration frequency wave contain carrier frequency waves of reversed phase. This voltage wave shown at $a$ in Fig. 3 is impressed on the demodulator D through the coupling condenser 30.

At the same time, a steady carrier voltage of constant amplitude, and of the same phase as that impressed on the bridge, appears across the secondary 23 of transformer T and is impressed on the demodulator diodes. This steady carrier voltage appearing across a half section of the center-tapped transformer secondary 23 is shown at $b$ in Fig. 3. The resistors 36 and 40, shown in series with the rectifiers, have ohmic resistances large compared with the internal rectifier resistances. Each may be considered part of the respective rectifier, functioning to maintain a substantially constant rectifier resistance during conduction. The voltages appearing across the resistors 36 and 40 are shown at $c$ and $d$ in Fig. 3. With circuit 34—38 open, the voltage across circuit 31—32 would be as represented at $a$. With circuit 34—38 in operation, but without output from amplifier 26, the voltage drops across the two resistors 36 and 40 and their respective diodes would be equal, and equal to the voltages across the half-sections of the transformer secondary, and junction point 37 would be at ground potential. But with the voltage wave $a$ impressed across circuit 31—32, and steady carrier voltage from transformer secondary 23 simultaneously impressed on circuit 34—38, the voltage drops across resistors 36 and 40 vary equally and oppositely by an amount substantially equal to the amplifier output voltage wave $a$, and the potential of the junction point 37 swings accordingly. Thus, assuming conduction in circuit 34—38, and assuming further that the phase of the amplifier output voltage is such that lead 31 is then at positive potential (first and third vibration frequency half-cycle loops at $a$, Fig. 3), there is an increase in current flow through resistor 36, and hence an increase in voltage drop thereacross, and an equal decrease in current flow through resistor 40, and therefore a decrease in voltage drop thereacross. And when the amplifier output voltage reverses phase (second and fourth vibration frequency half-cycle loops at $a$, Fig. 3), there is a decrease in current through resistor 36, with decrease in voltage drop thereacross, and an equal increase in current through resistor 40, with increase in voltage drop thereacross. In other words, the voltage drops across resistors 36 and 40, for the conductive portions of the cycle, are the vectorial combinations of the amplifier output voltage $a$ and the transformer voltages $b$, but owing to the manner of connection, the transformer voltages $b$ impressed across the half-sections of the circuit 34—38 act in opposite directions with respect to the junction point 37 with the circuit lead 31, and therefore combine oppositely with the amplifier voltage impressed across circuit 31—32. The voltage across resistor 36 may hence be obtained and plotted by algebraic addition of the voltage $b$ for the conductive part of the cycle, assuming the wave $b$ to have one sign with respect to wave $a$, as shown at $c$, and the voltage across resistor 40 may be obtained and plotted by algebraic addition of the voltage wave $a$ and carrier voltage $b$ for the conductive part of the cycle, assuming wave $b$ to have the opposite sign with respect to wave $a$, as shown at $d$.

Thus the voltage drops across resistors 36 and 40 increase and decrease equally and oppositely, following the sinusoidal outline N of wave $a$. And this effect, in turn, causes a corresponding swing in the potential of junction point 37 with respect to the grounded points of the circuits 31—32 and 34—33. Due to the by-pass action of the coupling condenser 30 to the carrier frequency, and the low internal resistance of the amplifier as compared with the diode resistors 36 and 40, it is impossible for the carrier frequency voltages developed across the resistors to appear to any substantial extent at point 37. The average value, or low frequency component L, however, is effectively blocked by condenser 30 from by-passing through the amplifier to ground, and does appear at junction point 37. This low frequency component L combines with voltage wave $a$ to produce the voltage wave shown at $e$ in Fig. 3. The low pass filter 42 removes the carrier frequency and transmits the low frequency output wave O, as shown at $f$, which wave is proportional to the outline N of wave $a$, and is a replica of the original vibratory movement of the pick-up armature.

It will be seen that the present system involves the use of a bridge or modulator means adjusted to the balance point, in conjunction with a balanced demodulator on which are separately impressed the output voltage wave of the modulator and a steady carrier frequency, the demodulator producing no output voltage with the bridge at balance, and functioning to combine internally the separately impressed bridge output voltage and carrier voltage to produce a demodulated wave which, after removal of the carrier, is a true representation of the mechanical input wave. The system has the important advantage that the sense or direction of the mechanical motion cannot be lost, or become ambiguous.

The specific circuit arrangements herein described are of course for illustrative purposes, and are not to be taken as limitative on the broader aspects of the invention, excepting as may fairly be construed from the appended claims.

We claim:

1. A demodulator circuit across which a modulated carrier frequency voltage wave is impressed, a transformer having a primary winding across which an unmodulated carrier frequency voltage is impressed and having a center tapped secondary winding, electrical conductor means between the center tap of said secondary winding and one side of said circuit on which said modulated wave is impressed, electrical conductors between the ends of said secondary winding and the other side of the last-mentioned circuit, and half-wave rectifier means in said conductors permitting current flow in one of the conductors in a direction away from said secondary winding and in the other of the conductors toward said secondary winding.

2. A demodulator circuit across which a modulated carrier frequency voltage wave is impressed, a transformer having a primary winding across which an unmodulated carrier frequency is impressed and having a center tapped secondary winding, electrical conductor means between the center tap of said secondary winding and one side of said circuit on which said modulated wave is impressed, electrical conductors between the ends of said secondary winding and the other side of the last-mentioned circuit, half-wave rectifier means in said conductors permitting current flow in one of the conductors in a direction away from said secondary winding and in the other of the conductors toward said secondary winding, and high resistances in said conductors in series with said half-wave rectifier means.

3. A demodulator embodying a circuit having input terminals across which a modulated carrier voltage is impressed, a coupling condenser in one side of said circuit, a voltage transformer having a primary winding and across which an unmodulated carrier voltage, in step with said modulated carrier voltage, is impressed, and having a center tapped secondary winding, electrical conductors connected between the ends of said secondary winding and said one side of said circuit, at a point located beyond said coupling condenser from the corresponding input terminal, a connection between the center tap of said secondary winding and the other side of said circuit, half-wave rectifier means in said conductors permitting current to flow in one of the conductors in a direction away from said secondary winding and in the other of the conductors toward said secondary winding, and high resistances in said conductors in series with said half-wave rectifier means.

4. A demodulator embodying a circuit having input terminals across which a modulated carrier frequency voltage is impressed, a coupling condenser in series in one side of said circuit, an impedance element across which may be developed a relatively high unmodulated carrier frequency voltage, electrical conductors connected between the terminals of said impedance element and the side of said output circuit that contains said coupling condenser, at a point located beyond said condenser from the corresponding input terminals, half-wave rectifier-resistor combinations in said conductors arranged to permit current to flow in opposite directions therein with respect to said impedance element, and an electrically conductive path between the other side of said circuit and a center point of said impedance element.

GEORGE W. DOWNS.
DUNFORD A. KELLY.

REFERENCES CITED

The following references are of record in the file of this patent:

UNITED STATES PATENTS

| Number | Name | Date |
|---|---|---|
| 2,113,376 | Janco | Apr. 5, 1938 |
| 2,078,796 | Greentree | Apr. 27, 1937 |
| 1,550,660 | Affel | Aug. 25, 1925 |
| 1,687,231 | Speed | Oct. 9, 1928 |
| 2,297,543 | Eberhardt | Sept. 29, 1942 |
| 2,210,970 | Bonell | Aug. 13, 1940 |
| 2,338,732 | Nosker | Jan. 11, 1944 |
| 2,305,267 | Minor et al. | Dec. 15, 1942 |